(12) United States Patent
McPherson (10) Patent No.: US 11,235,606 B2
(45) Date of Patent: Feb. 1, 2022

(54) SENSOR FOR EMULSION IRRADIATION

(71) Applicant: Shawn McPherson, Minneapolis, MN (US)

(72) Inventor: Shawn McPherson, Minneapolis, MN (US)

(*) Notice: Subject to any disclaimer, the term of this patent is extended or adjusted under 35 U.S.C. 154(b) by 0 days.

(21) Appl. No.: 16/789,676

(22) Filed: Feb. 13, 2020

(65) Prior Publication Data

US 2020/0262224 A1 Aug. 20, 2020

Related U.S. Application Data

(60) Provisional application No. 62/805,335, filed on Feb. 14, 2019.

(51) Int. Cl.
 *B41J 29/393* (2006.01)
 *G01N 21/59* (2006.01)

(52) U.S. Cl.
 CPC ............ *B41J 29/393* (2013.01); *G01N 21/59* (2013.01)

(58) Field of Classification Search
 CPC .... B41J 29/393; G01N 21/59; B41F 23/0453; B41F 15/12
 See application file for complete search history.

(56) References Cited

U.S. PATENT DOCUMENTS

| | | | |
|---|---|---|---|
| 6,278,510 B1 | 8/2001 | Stoebe et al. | |
| 6,683,421 B1 | 1/2004 | Kennedy | |
| 8,268,533 B2 | 9/2012 | Daens et al. | |
| 8,803,109 B1 | 8/2014 | McPherson | |
| 9,669,615 B2 | 6/2017 | McPherson | |
| 10,183,481 B2 | 1/2019 | McPherson | |
| 2006/0050122 A1 | 3/2006 | Nakano | |
| 2008/0023625 A1* | 1/2008 | Plank | G01J 1/4228 250/227.11 |
| 2008/0225270 A1* | 9/2008 | Senga | G01N 21/64 356/51 |
| 2009/0241788 A1 | 10/2009 | Leenders | |
| 2011/0000493 A1 | 3/2011 | Martinez et al. | |
| 2012/0007912 A1 | 1/2012 | Kagose et al. | |
| 2012/0305946 A1 | 12/2012 | Kuk et al. | |
| 2013/0007003 A1 | 3/2013 | Yang et al. | |
| 2013/0092847 A1 | 4/2013 | Childers | |
| 2013/0306872 A1* | 11/2013 | Paulson | G01N 33/32 250/341.8 |

(Continued)

OTHER PUBLICATIONS

Takach Press Corporation, "Nu-Arc/AmerGraph Exposure Units" printout, prior to Mar. 15, 2014 (downloaded Jun. 19, 2013), 10 pages.

(Continued)

*Primary Examiner* — Marcus H Taningco
(74) *Attorney, Agent, or Firm* — Patterson Thuente Pedersen, P.A.

(57) ABSTRACT

A system and method for determining when an emulsion or screen is properly cared including a light sensor located on an opposing side of the screen or emulsion from an LED light source operating in at least one wavelength in the ultraviolet range and a sensor monitor that that receives signals from the light sensor and determines the amount of light passing through the emulsion. When the amount of light passing through the emulsion reaches a minimum or approximates zero the sensor monitor may optionally deactivate the LED light source.

20 Claims, 12 Drawing Sheets

(56) References Cited

U.S. PATENT DOCUMENTS

| | | | | |
|---|---|---|---|---|
| 2015/0020704 A1* | 1/2015 | McPherson | ............ | B05D 3/067 |
| | | | | 101/129 |
| 2017/0326871 A1* | 11/2017 | McPherson | .......... | B41M 7/0081 |
| 2019/0201176 A1* | 7/2019 | Peterson | ................ | H05B 45/14 |
| 2019/0336259 A1* | 11/2019 | Elmore | .................... | C08F 2/48 |
| 2020/0001541 A1* | 1/2020 | Eiriksson | ............. | B29C 64/124 |

OTHER PUBLICATIONS

UV LED Exposure Box instructions and CAD drawings, Feb. 2012, 25 pages.

LDTronix LED Exposure Units, "The Baby Joe 2000 will be the best investment you will ever make for your business, and your peace of mind", http://www.ldtronix.com/buy-it-now.html, prior to Feb. 14, 2019, 1 page.

The Baby Joe 2000, http://www.ldtronix.com/baby-joe-2000.html, prior to Feb. 14, 2019, 2 pages.

LED Exposure Unit—Baby Joe 200 LED Exposure Unit, http://www.ldtronix.com, prior to Feb. 14, 2019, 2 pages.

Vastex Inernational, Inc., New LED Screen Exposing Unit, prior to Feb. 14, 2019, 1 page.

Why LED Exposure Units—LDTronix LED Exposure Units, Whats the difference?, http://www.IDtronix.com/whats-the-difference.html, prior to Feb. 14, 2019, 3 pages.

Thermal Analysis Application, "UV curing measured by DSC", Dec. 2009, 5 pages.

Application and File history for U.S. Appl. No. 13/843,198, filed Mar. 15, 2013. Inventor: Shawn McPherson.

Application and File History for U.S. Appl. No. 14/450,918, filed Aug. 4, 2014. Inventor: Shawn McPherson.

Application and File History for U.S. Appl. No. 15/611,502, filed Jun. 1, 2017. Inventor: Shawn McPherson.

\* cited by examiner

SENSOR FOR EMULSION IRRADIATION

RELATED APPLICATION

The present application claims the benefit of U.S. Provisional Application No. 62/805,335, filed Feb. 14, 2019, entitled "Sensor for Emulsion Irradiation," which is hereby incorporated herein in its entirety by reference.

TECHNICAL FIELD

The invention generally relates to imaging screen printing, printing materials and flexographic printing. More particularly, the invention relates to curing of emulsions on screens and other printing related products by exposure to particular wavelengths of electromagnetic radiation including, for example, ultraviolet radiation.

BACKGROUND

In the printing industry, a variety of screens and masks and other materials are created by applying a material to a substrate in a desired pattern and then exposing the material and the substrate to ultraviolet light radiation to cross-link the polymers in the material and thereby cure the material and secure it to the substrate. For the purposes of this application, the example of screens for silk screening and screen printing processes will be used. But it is to be understood that the curing processes disclosed herein can be applied to many other printing industry curing needs.

According to common practice in the industry, various exposure systems are used. An exposure system generally includes an enclosure, a transparent, transmissive or translucent platen and an opaque cover which also often includes a device for securing the screen to the platen during exposure process. The enclosure includes a source of electromagnetic radiation that produces electromagnetic radiation of the desired wavelength. Commonly, electromagnetic radiation is used in the ultraviolet wavelengths. In the past, illumination of these systems was provided by high intensity lamps such as metal halide lamps. Metal halide lamps produce a broad light spectrum including the ultraviolet spectrum. Besides the useful ultraviolet spectrum, metal halide lamps also produce a great deal of waste light, the waste light being the portion of the broad light spectrum that is not useful in the exposure process. This waste light represents a substantial waste of energy. It is not uncommon for screen light exposure systems to draw amounts of energy up to 6 kW. Generally, because of their high-power draw requirements metal halide lamp systems must be coupled to a 220 volt circuit to accommodate their power needs.

In addition, metal halide lamps produce large amounts of waste heat which must be dissipated. Accordingly, the systems often have complicated cooling systems. Some systems are cooled by cooling fans which must be continuously monitored to control lamp temperature and to prevent excess heat exposure from damaging the emulsion screens and substrates. To prevent excess heat exposure, some systems use water cooling arrangements in order to dissipate the great amount of excess heat produced.

Recently, developments in printing industry screen exposure lamps have been moving away from the inefficient halide lamps and toward LED systems, for example, a multi-spectrum LED system. The multi-spectrum screen exposure system is significantly more energy efficient as it produces less heat and thus requires less cooling than systems incorporating metal halide lamps. The enclosure includes a platen that is transparent, transmissive or translucent to at least some ultraviolet wavelengths of light. The cover is operably coupled to the enclosure and shiftable between an open orientation wherein the platen is accessible to an operator and a closed orientation wherein the platen is covered and inaccessible to the operator. The LED illumination light source assembly is supported within the enclosure and oriented to direct illumination toward the platen. The LED illumination light source assembly emits at least some light in the ultraviolet wavelengths. The control unit is operably coupled to the LED illumination light source assembly by which the LED illumination light source assembly can be operated in a controlled fashion.

In other areas, differential scanning calorimetry (DSC) has been used to determine how long certain samples have been exposed to UV light to achieve an adequate degree of curing. The technique involves placing samples in a furnace to determine the degree of curing or cross-linking as well as measuring the influence of temperature and light intensity on the curing process. DSC is a laboratory technique and gives examples of testing with powder coating materials that only incorporates the use of light sources such as a mercury xenon lamp or a halogen lamp.

SUMMARY

Although the multi-spectrum LED system has greatly improved efficiencies of exposure systems, it still requires screens to be cured for imprecise durations. Current exposure systems rely on a user conducting at least a test run wherein a screen is cured for an unnecessarily long amount of time to determine at what time interval it is optimally cured. This is necessary due to variances in such variables as screen mesh density altering the curing time.

The present invention addresses many of these problems by providing a sensor for emulsion radiation. Example embodiments of the invention utilize the opaque quality of a cured screen to accurately determine when the curing process is complete so that it may automatically power the exposure system down, increasing both energy and heat efficiency.

Specifically, the sensor, which is located on the side of the screen opposite the multi-spectrum LEDs or other light source, monitors the amount of light coming through the screen as it is cured. When the screen is fully cured the sensor reads that no or minimal light is coming through the now cured screen and thereby provides a signal that it has been sufficiently cured. Because the multi-spectrum LEDs have a known light intensity output a differential measuring process may not be required. The described embodiment is meant to serve as an example of a basic implementation of the sensor in an exposure unit. The sensor according to example embodiments of the invention is expected to be adaptable for any type of exposure unit that utilizes multi-spectrum illumination including broad spectrum exposure units utilizing metal halide curing illumination sources.

According to another example embodiment of the invention, a lens is placed between the sensor and the screen being cured. The lens gathers light from a wider area than the sensor alone and directs the light to the sensor. According to an example embodiment of the invention the collecting lens is a positive power lens that is separated by the sensor by approximately the focal length of the lens.

For the purposes of this application, the term "printing emulsion" should be interpreted broadly as including anything utilized in the printing industry that is cured by the application of electromagnetic radiation including but not limited to light radiation in the ultraviolet wavelengths.

The above summary is not intended to describe each illustrated embodiment or every implementation of the subject matter hereof. The figures and the detailed description that follow more particularly exemplify various embodiments.

BRIEF DESCRIPTION

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring now to the drawings and illustrative example embodiments depicted therein, an example multi-spectrum screen exposure system 100 generally includes an enclosure 102, a cover 104, a light emitting diode (LED) illumination light source assembly 106, and a control unit 108.

Figure 1:
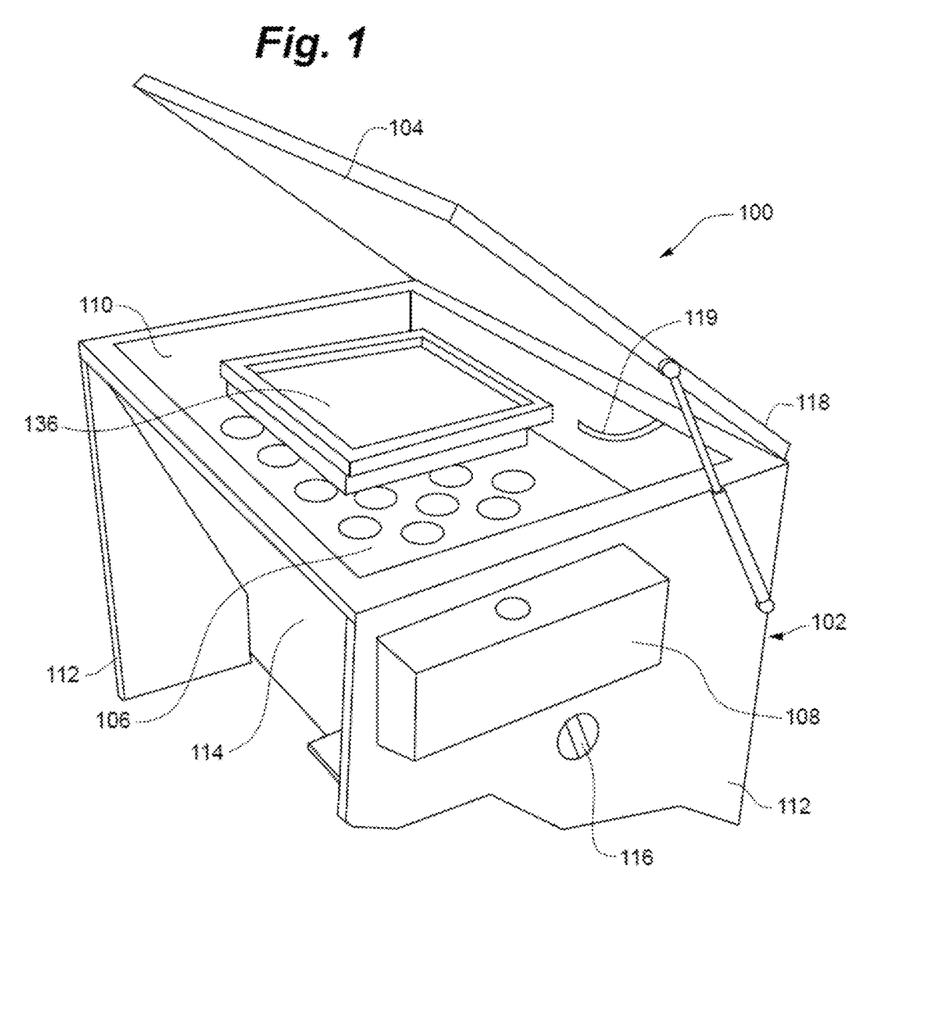
FIG. 1 is a perspective view of a multi-spectrum screen exposure system according to an example embodiment of the invention.

As best seen in FIG. 1, enclosure 102 includes a platen 110 on which materials to be irradiated are placed. Platen 110 according to an example embodiment of the present invention is a flat supporting surface made of glass or polymer material, and is at least transparent, transmissive or translucent to some ultraviolet wavelengths of light. In particular, platen 110 is transparent, transmissive or translucent to the particular wavelengths of electromagnetic radiation necessary to cross-link the polymers in the material to be irradiated, for example, in curing emulsions on screens and other substrates. The platen according to the present invention is generally conventional in this regard and need not be further described here.

In an example embodiment, enclosure 102 generally includes supporting legs 112, light unit enclosure 114, and optionally cooling fan 116. Supporting legs 112 support light unit enclosure 114 at a convenient height so that platen 110 is available at a roughly countertop height for the placement of substrates including emulsions. As discussed above, LED illumination light source 106 according to example embodiments of the invention produces far less waste heat than prior art illumination systems, but optionally multi-spectrum screen exposure system 100 can include a cooling fan 116. In an example embodiment, enclosure 102 can include a rack to hold printing screens 136 or other materials used in conjunction with curing printing emulsions.

Cover 104 is operably coupled to enclosure 102. In an example embodiment, cover 104 can be hingedly attached to enclosure 102, for example by one or more hinges. Relative to enclosure 102, cover 104 is shiftable between an open orientation, wherein platen 110 is accessible to an operator, and a closed orientation, wherein platen 110 is covered by cover 104 and inaccessible to an operator. Cover 104 can have one or more clamps for connecting cover 104 to enclosure 102 when in the closed orientation for the purpose of providing a tighter seal between cover 104 and enclosure 102 when in the closed orientation.

Cover 104 is generally opaque to the particular wavelengths of electromagnetic radiation utilized to cross-link the polymers for the purpose of protecting operators from undesirable exposure to electromagnetic radiation. Optionally, cover 104 can include vacuum holding system 118 or other holding systems, thereby creating a vacuum between cover 104 and platen 110 for the purpose of immobilizing the material to be irradiated against platen 110. Vacuum holding system 118 can include vacuum hose 119. To aid in the immobilization of the material, cover 104 can be constructed of a flexible material so that when a vacuum is created between cover 104 and platen 110, cover 104 can temporarily deform to hold the material in place and substantially flat against platen 110. Other aspects of the vacuum holding systems 118 or other holding systems are generally conventional and well-known in the art and will not be further described here.

Figure 2:
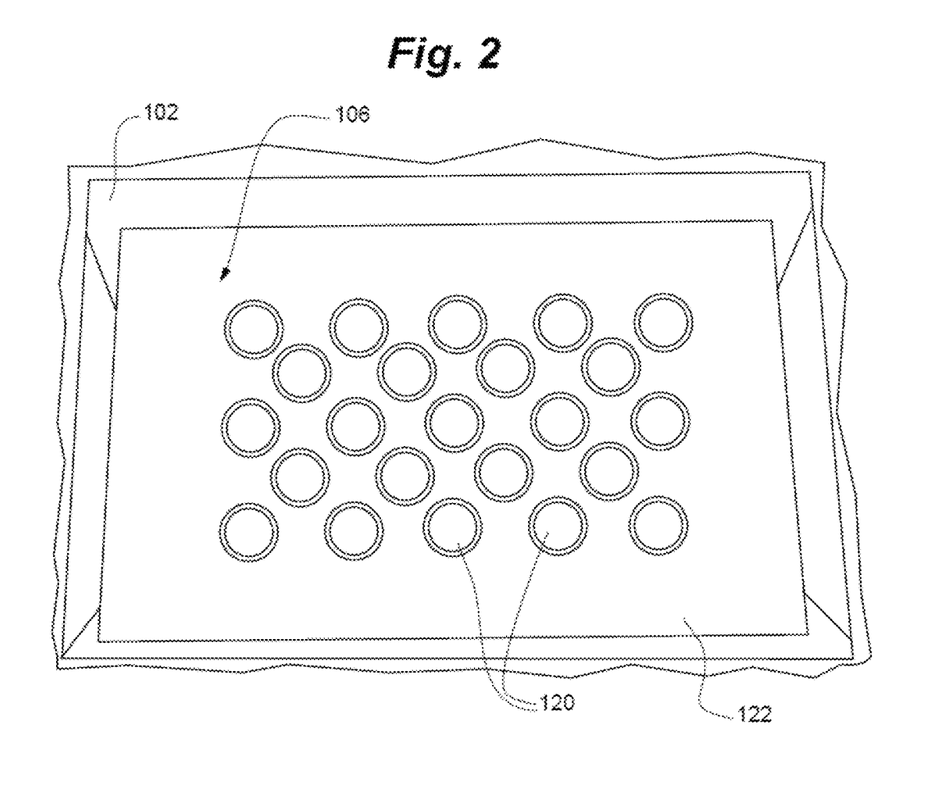
FIG. 2 is a perspective view of an LED illumination light source assembly according to an example embodiment of the invention.
Figure 3:
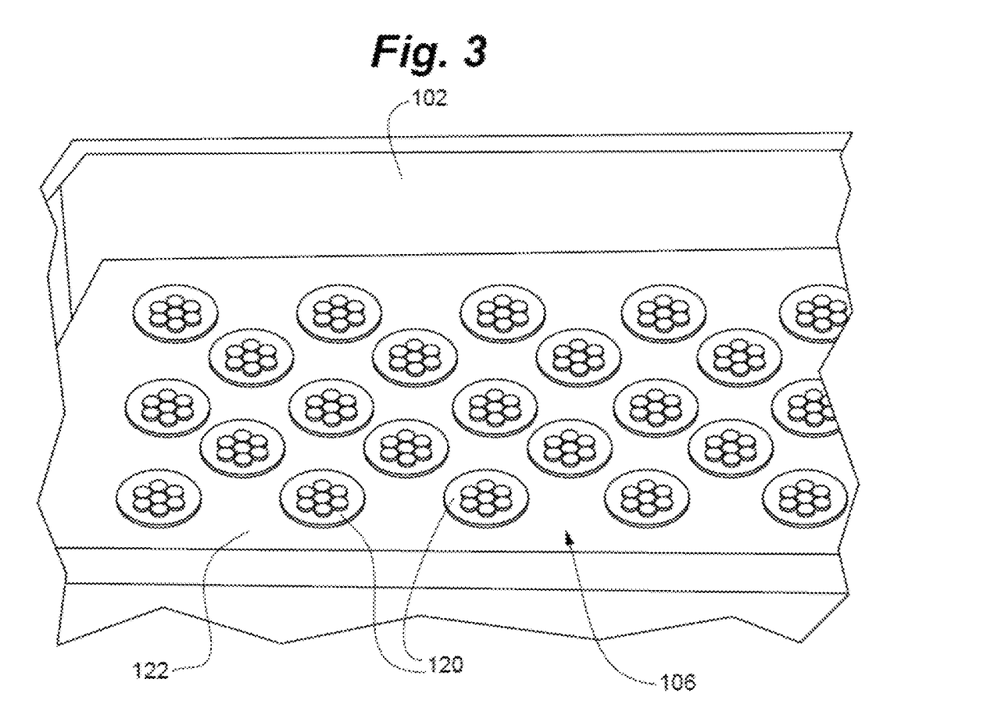
FIG. 3 is another perspective view of the LED illumination light source assembly of FIG. 2.

LED illumination light source assembly 106 is supported within enclosure 102. In an example embodiment, LED illumination light source assembly 106 can be housed in light unit enclosure 114 of enclosure 102.

LED illumination light source assembly 106 is oriented to direct illumination toward platen 110. When activated the LED illumination light source assembly 106 emits at least some light in the ultraviolet wavelengths. Thus, when the LED illumination light source assembly 106 is activated, a least a portion of the ultraviolet wavelengths emitted by LED illumination light source assembly 106 passes through the transparent, transmissive or translucent platen 110. In an example embodiment, LED illumination light source assembly 106 can be spaced at a distance wherein light emitted from LED illumination light source assembly 106 evenly illuminates platen 110. In another example embodiment, LED illumination light source assembly 106 can be spaced in a range from 5 inches to 9 inches from, and generally parallel, to platen. 110. In yet another example embodiment, LED illumination light source assembly 106 can be spaced approximately 7 inches from platen 110. Such spacing allows substantially even distribution of the ultraviolet wavelengths through platen 110 to provide greater cross-linking of polymers in the material to be irradiated. Additionally, such spacing allows what heat is generated by LED illumination light source assembly 106 to be dissipated.

Figure 4:
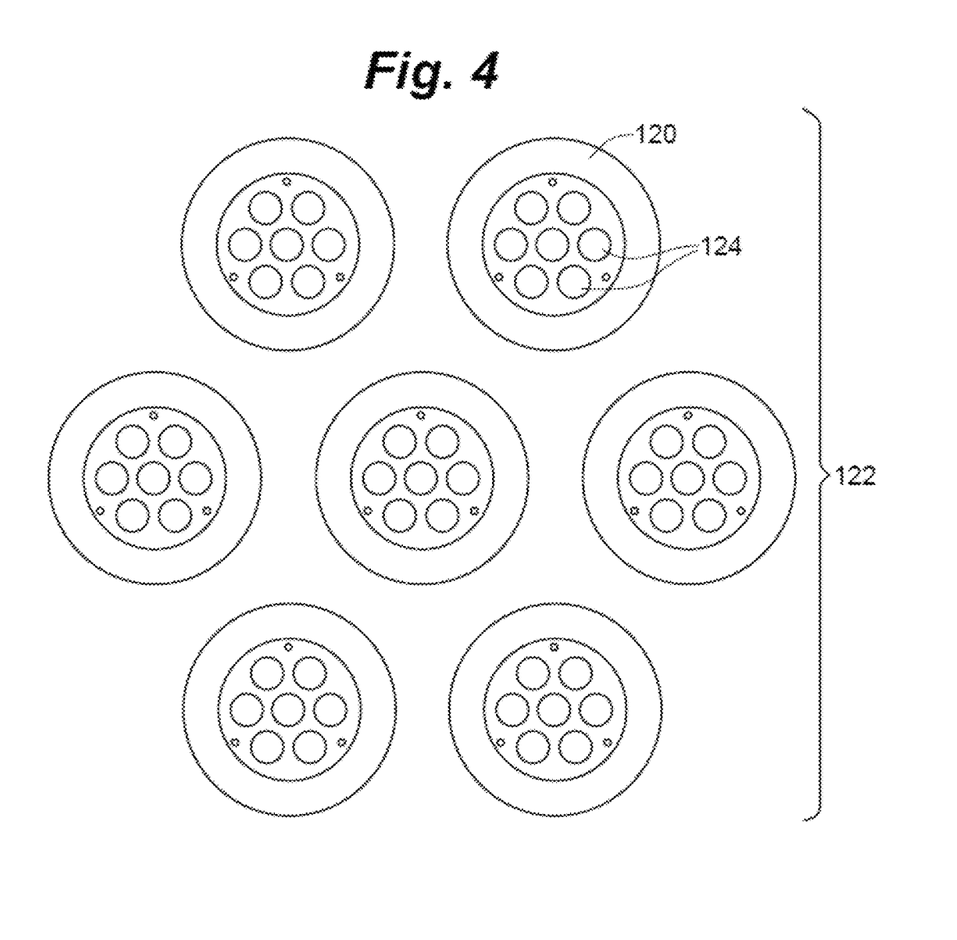
FIG. 4 is a schematic plan view of an LED lamp support array according to an example embodiment of the invention.

In an example embodiment, LED illumination light source assembly 106 includes a plurality of LED lamps 120 supported in lamp support array 122. In another example embodiment, any number of LED lamps 120 can be arranged for example in a geometrically regular fashion. In yet another example embodiment, as best seen in FIG. 4, LED lamps 120 can be arranged in a generally hexagonal array.

With the generally hexagonal array pattern, in an example embodiment, the spacing between LED lamps 120 can be in a range from 2.75 inches to 6.75 inches. In another example embodiment, the spacing between LED lamps 120 can be approximately 4.75 inches. The generally hexagonal array pattern and distance between LED lamps 120 is selected to provide substantially even distribution of the light over platen 110 for the purpose of providing more even cross-linking of polymers in the material to be irradiated.

Figure 5:
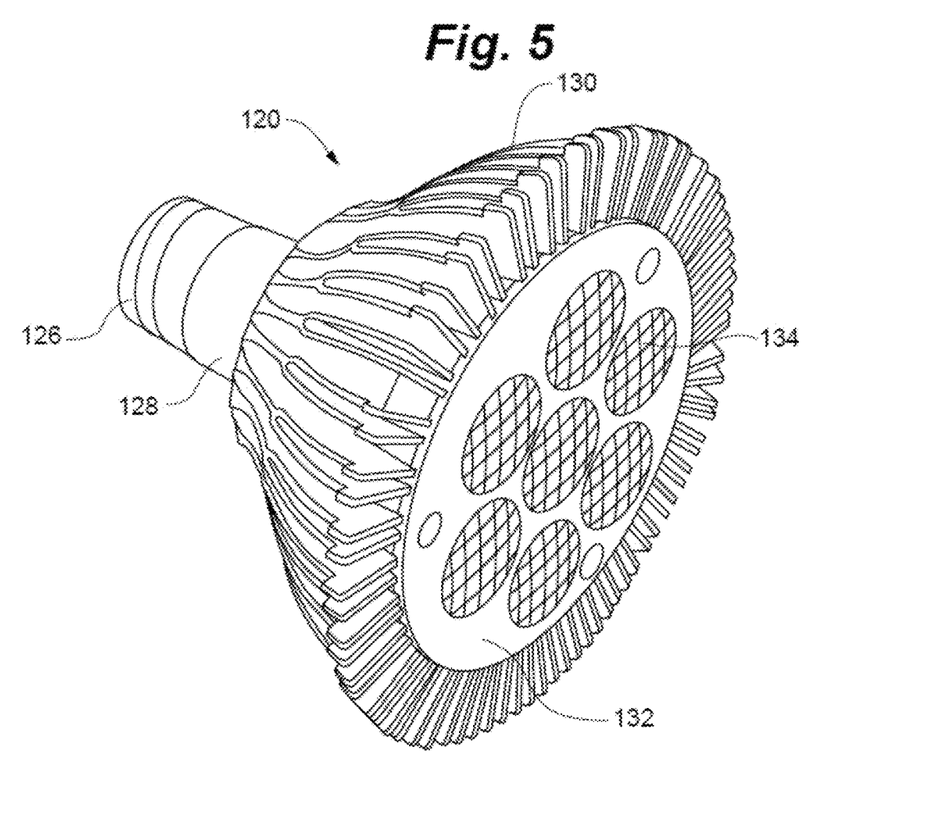
FIG. 5 is a perspective view of an LED lamp according to an example embodiment of the invention.

In an example embodiment, each LED lamp 120 can be comprised of a plurality of LEDs 124. The plurality of LEDs 124 emit ultraviolet light in multiple wavelengths. According to an example embodiment of the invention, the total range of LED wavelengths can be in a range from 365 to 420 nm.

According to an example embodiment, as seen for example in FIG. 5, each LED lamp 120 includes electrical plug 126, body 128, heat sink 130, and LED array 132. Electrical plug 126 can be sized to fit in a standard sized light socket. Body 126 can be constructed, for example, of plastic and couples electrical plug 126 to heat sink 130. Heat sink 130 can be constructed, for example, of a thermally conductive material, such as aluminum. Heat sink 130 can include a plurality of fins for the purpose of dissipating what heat is generated by LEDs 124. LED array 132 can be coupled to either body 128, heat sink 130, or both. LED array 132 can house a plurality of LEDs 124. In an example embodiment, the LEDs 124 can be 1.0625 inches from the outer edge of heat sink 130, as measured from the center of each LED 124. Each individual LED 124 can be accompanied by a 60 degree wide angle lens or diffuser 134 which disperses the light of the LEDs at approximately a 60 degree angle.

Figure 6:
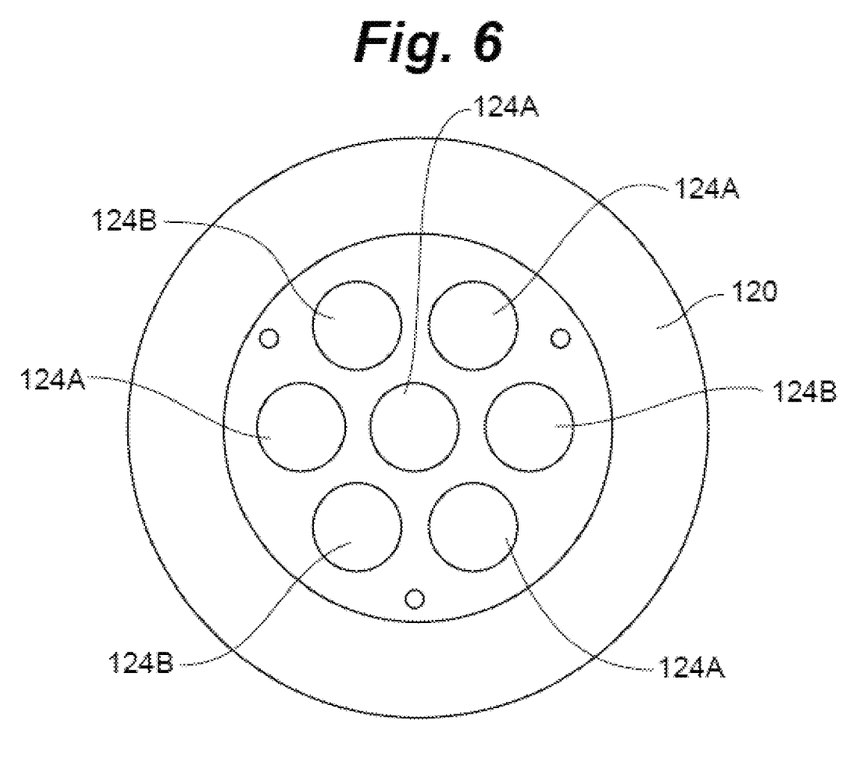
FIG. 6 is a schematic plan view of an LED lamp including seven LEDs according to an example embodiment of the invention.
Figure 7:
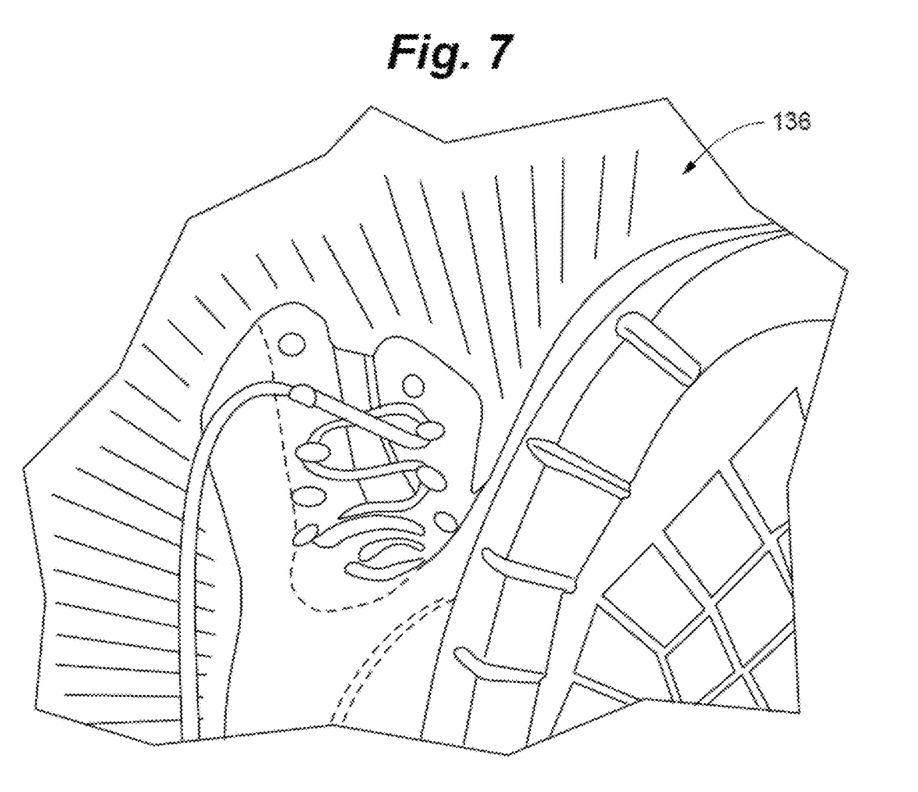
FIG. 7 is a depiction of a printing screen that the invention is utilized to cure.

In an example embodiment, as seen, for example in FIG. 6, each LED lamp 120 can include seven LEDs 124, wherein six LEDs 124 are substantially equally spaced circumferentially around a single central LED 124. According to an example embodiment, each LED 124 can be spaced 0.75 inches apart, as measured from the center of each LED 124. According to an example embodiment, each LED 124 can be 1 W and each LED lamp 120 can be 7 W.

According to an example embodiment, the LED lamp 120 includes a first portion of the LEDs 124 emitting a first wavelength and a second portion of the LEDs 124 emitting a second wavelength. According to an example embodiment, the LED lamp 120 can include four LEDs 124A emitting light at approximately 420 nm and three LEDs 124B emitting light at approximately 395 nm. According to an example embodiment, the 420 nm LEDs 124A are located centrally and at 120 degree increments surrounding the central 420 nm LED 124A. According to this example embodiment, the wavelength range of the 420 nm LEDs 124A can range from approximately 420 to 430 nm. According to this example embodiment, the 395 nm LEDs 124B are located at 120 degree increments surrounding the central 420 nm LED 124A with each 395 nm LED 124B being alternated with a 420 nm LED 124A. According to this example embodiment, the wavelength range of the 395 nm LEDs 124B can range from approximately 395 to 405 nm.

The control unit 108 of multi-screen exposure system 100 is operably coupled to LED illumination light source assembly 106 by which the LED illumination light source assembly can be operated in a controlled fashion. According to an example embodiment, control unit 108 includes an on/off switch which can be coupled to an accurate timer including a mechanical timer or an electronic timer that controls the on/off cycle of LED lamps 120. Accordingly, control unit 108 is much simpler than those in the prior art.

Control unit 108 can also include cooling controls such as a thermistor for sensing temperature within the unit to actuate a cooling fan if needed. However, because the LED illumination light source assembly 106 of the present invention produces much less heat than the prior art, the cooling system can be much simpler and draw much less power than cooling systems of the prior art. For example, the cooling system of the present invention can be comprised of one or two muffin fans, as opposed to the elaborate air or water cooling systems of the prior art.

Referring to FIGS. 8 through 11, according to another example embodiment of the invention sensor 160 coupled to sensor monitor 260 is located on an opposing side of screen 170 from LED lamps. Accordingly, sensor 160 receives light that has passed through screen 170. Sensor 160 may be a photocell that has sensitivity at least in the ultraviolet wavelengths. Sensor monitor 260 receives output from sensor 160 indicative of the intensity of the light that is passing through screen 170 and received by sensor 160. Sensor monitor 260 displays for example intensity of light that is received at sensor 160. Sensor monitor 260 according to another example embodiment of the invention is operably coupled to the control unit 108 in such a way that when sensor 160 receives minimal light or zero light output control unit 108 deactivates LED illumination light source assembly 106.

Figure 8:
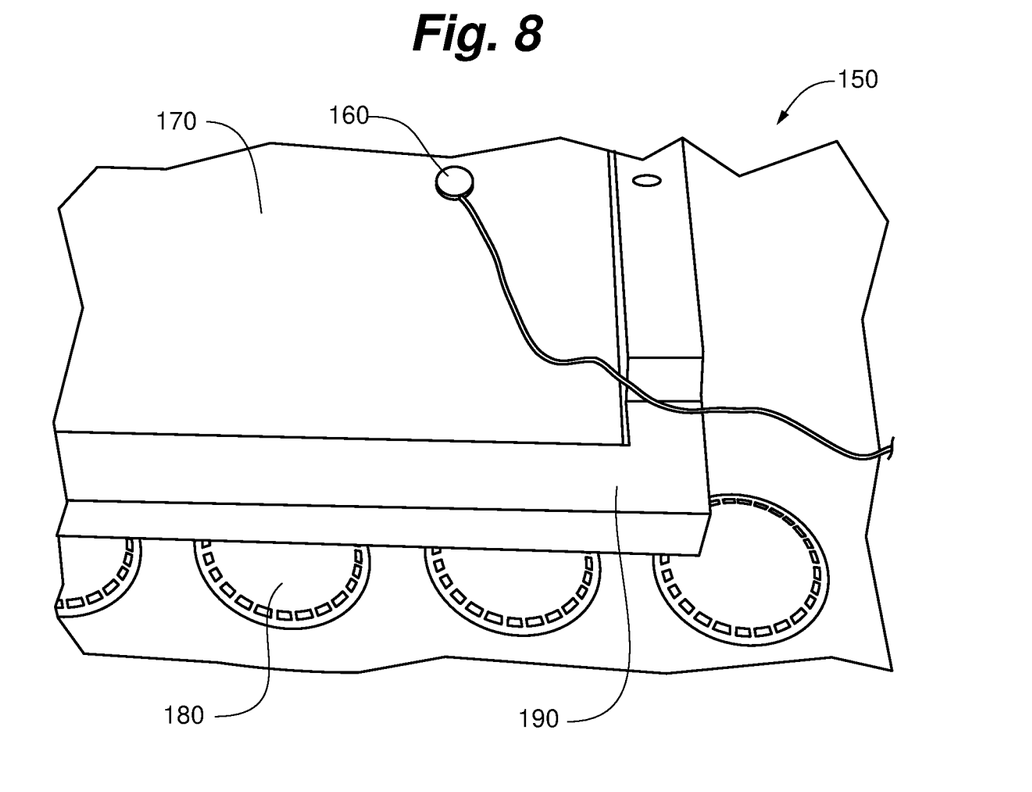
FIG. 8 depicts a sensor placed on an opposing side of a screen to be cured from a light source in a multi-spectrum LED exposure system according to an example embodiment of the invention.

In one embodiment seen in FIG. 8, multi-spectrum LED screen exposure system 150 has sensor 160 placed above screen 170 on screen 190 while LED illumination light source assembly 106 is located below screen. Focused multi-spectrum LEDs 180 are located below screen 170 such that when multi-spectrum LED screen exposure system 150 is closed the sensor 160 will only record light that has passed through screen 170.

Figure 9:
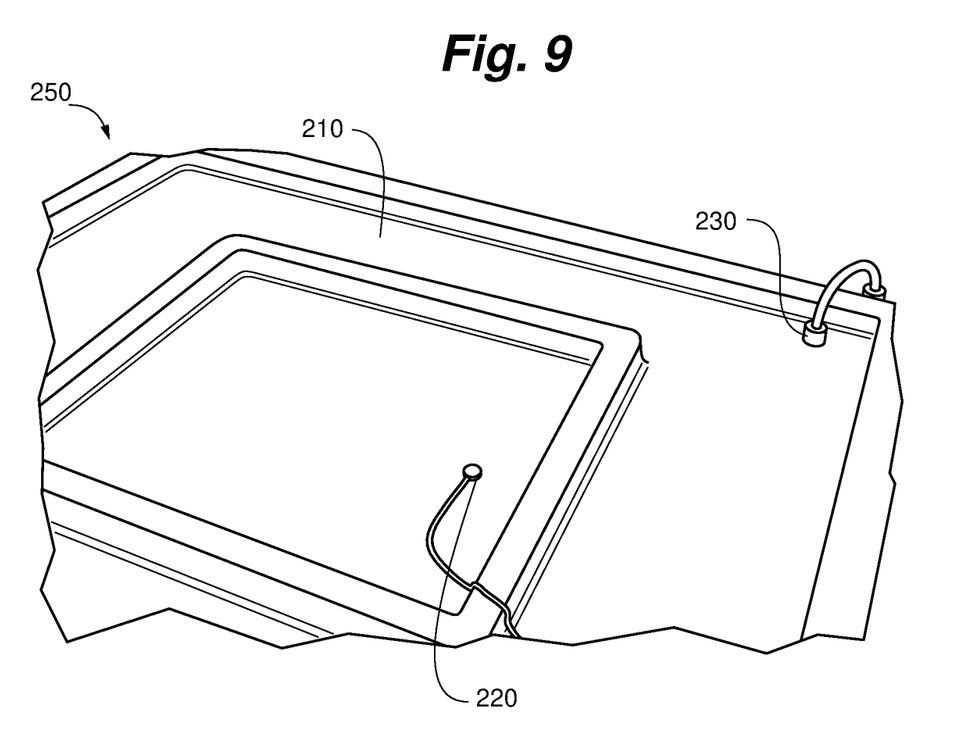
FIG. 9 depicts a sensor placed on an opposing side of a screen to be cured from a light source in a multi-spectrum LED exposure system that has its cover suctioned closed according to an example embodiment of the invention.
Figure 10:
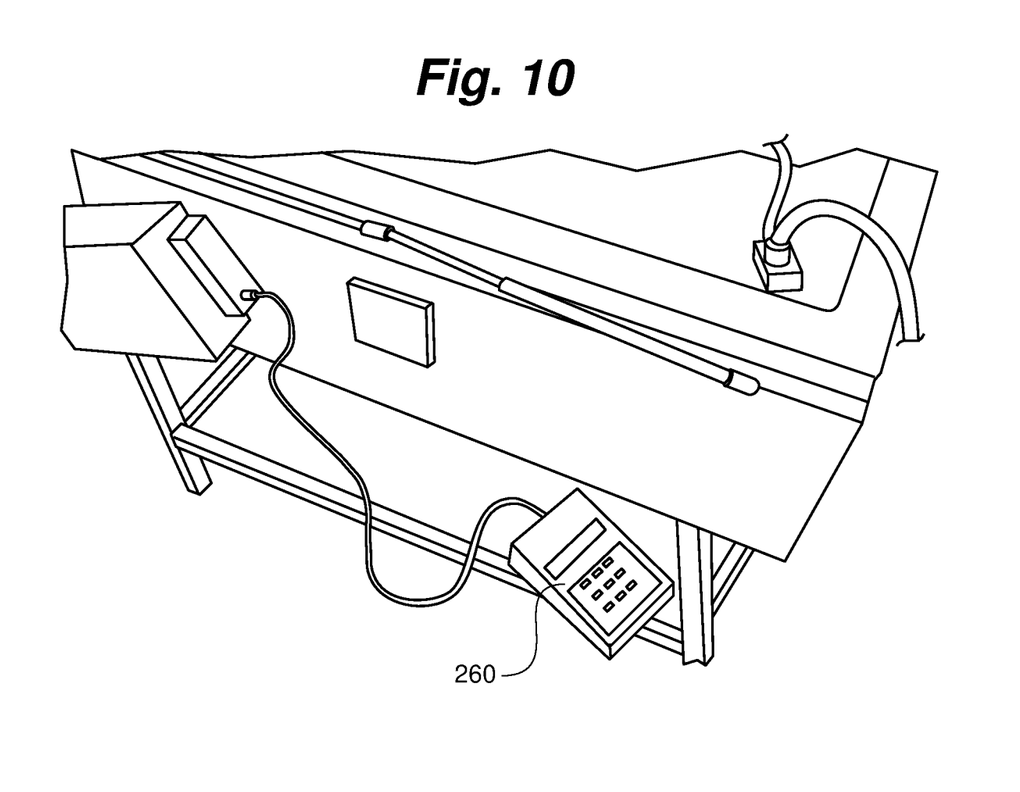
FIG. 10 depicts a side of a multi-spectrum LED exposure system where sensor data is being displayed on a sensor monitoring device according to an example embodiment of the invention.

FIG. 9 depicts an embodiment of a multi-spectrum LED screen exposure system 250 in another example of operation. Optionally, the operator may suction the cover 210 using suction apparatus 230 to ensure no ambient light is recorded by sensor 160 during the curing process. The reading of sensor 160 is reflected in FIG. 10 on sensor monitor 260.

Figure 11:
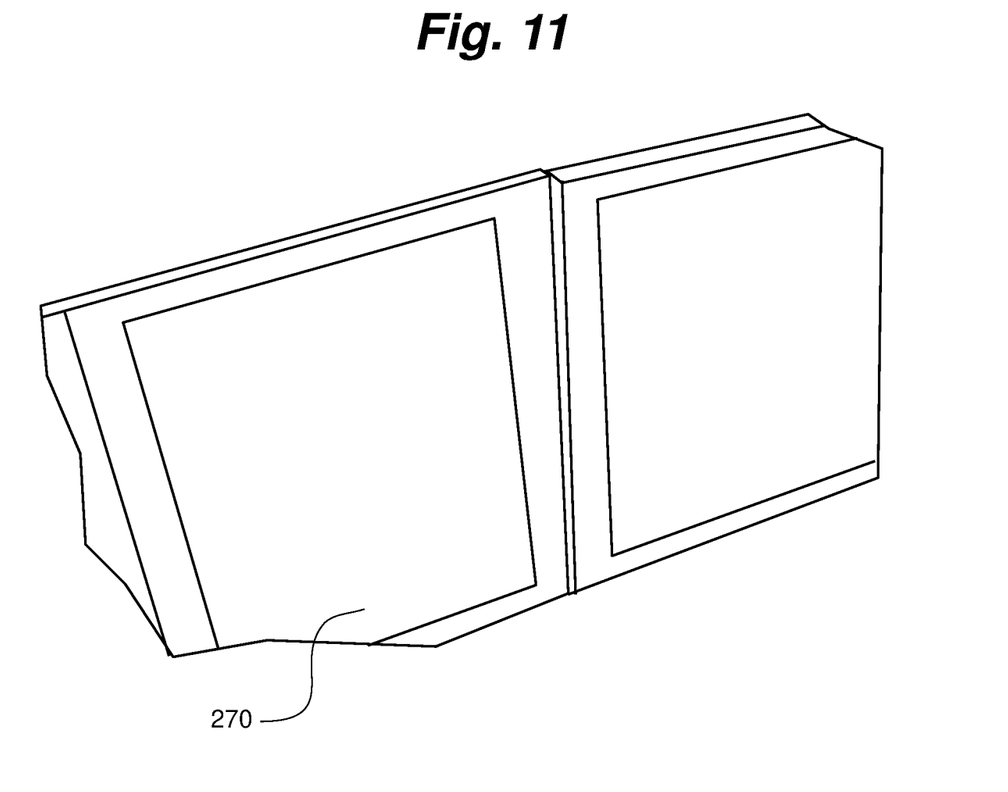
FIG. 11 is an image of multiple screens with varying mesh that may be cured in association with the sensor according to an example embodiment of the invention.

FIG. 11 depicts screen 270 that an operator may place inside a multi-spectrum LED screen exposure system that uses sensor 160 to observe the amount of light passing through screen 270.

According to another embodiment of the invention, a method of determining when a printing emulsion is properly cured includes locating an LED light source on a first side of the printing emulsion; locating a light-sensitive sensor that is sensitive to at least ultraviolet wavelengths of light on an opposing second side of the printing emulsion from the LED light source; illuminating the LED light source and directing illumination toward the printing emulsion; monitoring a level of light from the LED light source passing through the printing emulsion with light-sensitive sensor 160; and optionally, deactivating the LED light source when the level of illumination detected by sensor 160 approximates zero.

Figure 12:
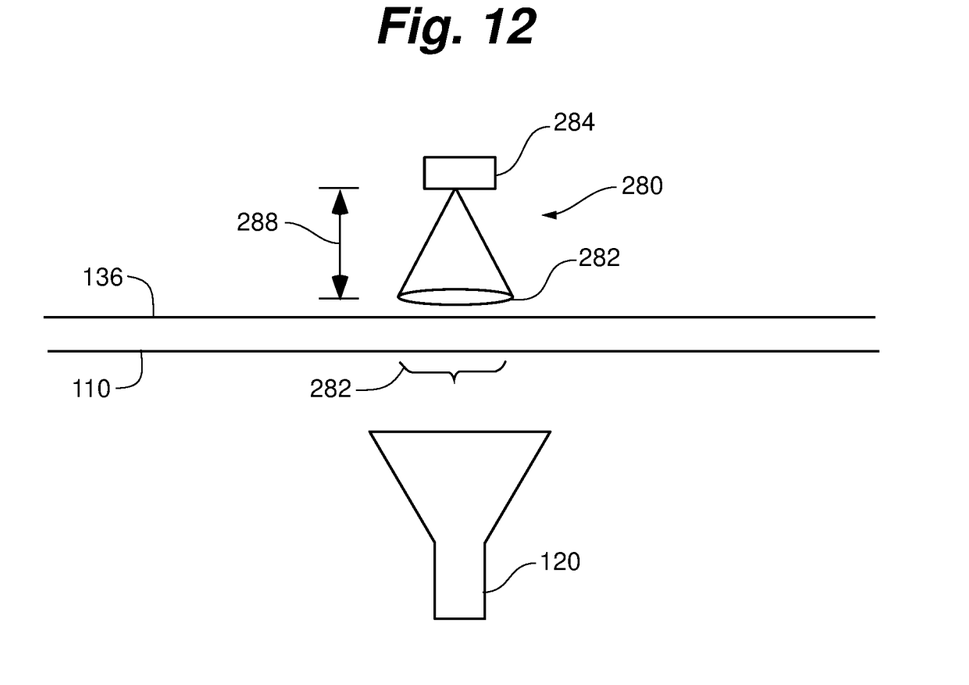
FIG. 12 is a schematic depiction of a sensor along with a collecting lens placed on an opposing side of a screen to be cured from a light source in a multi-spectrum LED exposure system according to an example embodiment of the invention.

FIG. 12 schematically depicts focused sensor 280 according to a further example embodiment of the invention. Focused sensor 280 generally includes lens 282 and photodetector 284. Lens 282 is generally a positive power lens and has a diameter 286 that is substantially greater than that of photodetector 284. Lens 282 is separated from photodetector 284 by a distance substantially equal to focal length 288 of lens 282. Accordingly, lens 282 gathers light over a larger area than photodetector 284 does on its own and directs light to photodetector 284. In this way, focused sensor 280 serves to gather light over a larger area of a screen or emulsion and mitigates the effect of denser areas of the screen or emulsion on detection of light passing through the screen or emulsion.

In operation, an operator of the present invention can use the multi-spectrum screen exposure system 100 to cure printing emulsions on printing screens 136 and other printing related products by exposing the printing emulsions to particular wavelengths of electromagnetic radiation generated by the multi-spectrum screen exposure system 100. The method of curing a printing emulsion can include placing a printing emulsion on a platen of a multi-spectrum screen exposure system and exposing the printing emulsion to ultraviolet wavelengths of light.

In another example of operation, the operator ensures that cover 104 is positioned in an open orientation wherein the platen is accessible to the operator. The operator places emulsion materials on platen 110. Optionally, the operator can place a vacuum cover 119 on or proximate to the emulsion materials. Cover 104 can be positioned in a closed orientation wherein the platen 110 is covered by cover 104 and is inaccessible to the operator. Optionally, operator can latch cover 104 to enclosure 102 to create a tight seal between cover 104 and the top of enclosure 102. Optionally, the operator can actuate a vacuum holding system 118. Optionally, the operator can set a timer of the control unit 108. The operator actuates the LED illumination light source 106. After a period of time, operator can position the on/off switch to the off position, and if the vacuum holding system 118 was used, deactivate the vacuum holding system 118. The operator can position the cover 104 in an open orientation (including releasing any latches if used), and remove the cured emulsion materials from platen 110.

When utilized, focused sensor 280 is placed so that lens 282 is proximate the emulsion or screen to be irradiated. Lens 282 gathers light over a larger area than photodetector 284 does on its own and directs light to photodetector 284. In this way, focused sensor 280 serves to gather light over a larger area of a screen or emulsion and mitigates the effect of denser areas of the screen or emulsion on detection of light passing through the screen or emulsion.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for determining when a printing emulsion is properly cured, comprising:
   a light-sensitive sensor sensitive in at least one ultraviolet wavelength;
   an LED light source emitting radiation in the at least one ultraviolet wavelength that is selected to facilitate curing the printing emulsion;
   a sensor monitor operably coupled to the light sensitive sensor and to a control unit for the LED light source;
   wherein the light-sensitive sensor is located on an opposing side of a printing emulsion to be cured from the LED light source and located to receive the radiation emitted from the LED light source emitting the radiation in the at least one ultraviolet wavelength selected to facilitate curing the printing emulsion; and
   wherein when the sensor monitor determines that a level of light reaching the sensor approaches a minimum the sensor monitor signals the control unit for the LED light source to deactivate the LED light source.

2. The system as claimed in claim 1, wherein the minimum approximates zero light reaching the sensor.

3. The system as claimed in claim 1, further comprising a platen that supports the printing emulsion.

4. The system as claimed in claim 3, wherein the platen is transparent to the at least one ultraviolet wavelength.

5. The system as claimed in claim 3, wherein the platen is located between the printing emulsion and the LED light source.

6. The system as claimed in claim 1, further comprising a cover opaque to the at least one ultraviolet wavelength.

7. The system as claimed in claim 1, further comprising a vacuum holding system.

8. The system as claimed in claim 1, wherein the light-sensitive sensor further includes a lens.

9. The system as claimed in claim 8, wherein the lens is positioned approximately a focal length from the light-sensitive sensor and has a diameter greater than that of the light-sensitive sensor.

10. The system as claimed in claim 8, wherein the lens is positionable proximate the printing emulsion with the light-sensitive sensor on an opposing side of the lens from the printing.

11. A method of determining when a printing emulsion is properly cured, comprising:
    locating an LED light source that emits light in at least one ultraviolet wavelength selected to facilitate curing the printing emulsion on a first side of the printing emulsion:
    locating a light-sensitive sensor sensitive to the at least one ultraviolet wavelength of light emitted by the LED light source on an opposing second side of the printing emulsion from the LED light source and locating the light-sensitive sensor to receive radiation emitted from the LED light source;
    illuminating the LED light source and directing the light emitted by the LED light source toward the printing emulsion and toward the light-sensitive sensor;
    receiving a signal from the light-sensitive sensor at a sensor monitor operably coupled to the light sensitive sensor and coupled to a control unit for the LED light source;
    wherein the light-sensitive sensor is located on an opposing side of a printing emulsion to be cured from the LED light source;
    monitoring a level of light from the LED light source passing through the printing emulsion with the light-sensitive sensor; and
    optionally deactivating the LED light source when the level of light passing through the printing emulsion and reaching the light-sensitive sensor approaches a minimum.

12. The method as claimed in claim 11, further comprising designating the minimum to approximate zero light reaching the sensor.

13. The method as claimed in claim 11, further comprising supporting the printing emulsion on a platen.

14. The method as claimed in claim 13, further comprising selecting the platen to be transparent to the at least one ultraviolet wavelength.

15. The method as claimed in claim 13, further comprising positioning the platen to be located between the printing emulsion and the LED light source.

16. The method as claimed in claim 11, further comprising covering the printing emulsion with a cover opaque to the at least one ultraviolet wavelength.

17. The method as claimed in claim 11, further comprising utilizing a vacuum holding system to secure the printing emulsion in place.

18. The method as claimed in claim 11, further comprising utilizing the light-sensitive sensor along with a lens.

19. The method as claimed in claim 18, further comprising positioning the lens approximately a focal length of the lens from the light-sensitive sensor and an selecting the lens to have a diameter greater than that of the light-sensitive sensor.

20. The method as claimed in claim 18, further comprising positioning the lens proximate the printing emulsion with the light-sensitive sensor on an opposing side of the lens from the printing.

* * * * *